(12) United States Patent
Sula et al.

(10) Patent No.: US 7,688,229 B2
(45) Date of Patent: Mar. 30, 2010

(54) SYSTEM AND METHOD FOR STITCHING OF VIDEO FOR ROUTES

(75) Inventors: Nicholas Sula, Chicago, IL (US); Peter Seegers, Evanston, IL (US); James Lynch, Chicago, IL (US); William Gale, Oak Park, IL (US); Bradley Kohlmeyer, Lisle, IL (US)

(73) Assignee: NAVTEQ North America, LLC, Chicago, IL (US)

( * ) Notice: Subject to any disclaimer, the term of this patent is extended or adjusted under 35 U.S.C. 154(b) by 248 days.

(21) Appl. No.: 11/796,789

(22) Filed: Apr. 30, 2007

(65) Prior Publication Data
US 2008/0266142 A1 Oct. 30, 2008

(51) Int. Cl.
*G08G 1/123* (2006.01)
(52) U.S. Cl. .................. 340/995.17; 340/995.13; 701/200; 715/726
(58) Field of Classification Search ............ 340/995.13, 340/995.17, 995.1, 995.14, 995.15, 995.18, 340/995.19, 995.2; 701/211, 200, 208, 207; 715/726, 716; 382/104, 156; 348/143, 113
See application file for complete search history.

(56) References Cited

U.S. PATENT DOCUMENTS

| | | | | |
|---|---|---|---|---|
| 5,161,886 A | | 11/1992 | De Jong et al. ............. 364/449 |
| 5,774,569 A | * | 6/1998 | Waldenmaier ............... 382/100 |
| 6,222,583 B1 | * | 4/2001 | Matsumura et al. ......... 348/113 |
| 6,363,161 B2 | * | 3/2002 | Laumeyer et al. ........... 382/104 |
| 7,155,336 B2 | | 12/2006 | Dorfman et al. ............ 701/200 |
| 7,216,035 B2 | | 5/2007 | Hortner et al. .............. 701/211 |
| 2004/0098175 A1 | | 5/2004 | Said et al. ....................... 701/1 |
| 2007/0118281 A1 | * | 5/2007 | Adam et al. ................. 701/211 |

* cited by examiner

*Primary Examiner*—Anh V La
(74) *Attorney, Agent, or Firm*—Adil M. Musabji; Frank J. Kozak; Jon D. Shutter (57) ABSTRACT

A system and method are disclosed for displaying video on a computing device for navigation and other purposes. A map database developer collects video data. The video data is collected by traveling along roads in a geographic area and storing the video data along with data indicating the positions at which the video data had been captured. This captured video data is then used in navigation systems and other devices that provide navigation, routing, video games, or other features. An application forms a video that shows a turn at an intersection from a first road onto a second road. The application adds video that depicts travel away from the intersection along the second road to video that depicts travel into the intersection along the first road to form a composite video that shows a turn at the intersection from the first road onto the second road. The composite video is then presented to a user on a display.

22 Claims, 10 Drawing Sheets

SYSTEM AND METHOD FOR STITCHING OF VIDEO FOR ROUTES

REFERENCE TO RELATED APPLICATIONS

The present application is related to the patent application entitled "STREET LEVEL VIDEO SIMULATION DISPLAY SYSTEM AND METHOD" Ser. No. 11/796,899, the entire disclosure of which is incorporated by reference herein.

BACKGROUND OF THE INVENTION

The present invention relates to displaying video image information on a computing device used for navigation, computer games and other purposes.

Various kinds of systems and applications are available that provide individuals with useful information for traveling. For example, navigation systems installed in vehicles provide useful information to vehicle drivers and passengers, including information for finding desired destinations, as well as guidance for following routes to desired destinations. Similar features are available on portable (e.g., handheld) devices, such as personal navigation systems, personal digital assistants with navigation functions and mobile phones. Useful navigation, routing, and map information is also available from various web sites.

Meaningful routing or navigation guidance includes helping a user ascertain his/her location and orientation relative to his/her surroundings. U.S. Pat. No. 5,161,886 discloses a method for showing a perspective, or 3D, view of a vehicle's position on a map generated from two dimensional data. This type of view can be useful for helping a user determine his/her position relative to the road network and guiding the user to a desired destination.

Although the method disclosed in U.S. Pat. No. 5,161,886 is helpful, there exists room for improvement.

For example, it would be helpful to show a user an actual video depicting a maneuver from the vantage point of the user, i.e., the driver of a vehicle. The maneuver may be a turn from one road onto another, a merge onto an entrance ramp, a merge onto an exit ramp, or even a U-turn. However, collecting video data depicting all the possible maneuvers that a driver could take would be a time-consuming and expensive undertaking. It would also be expensive and time-consuming to keep such a collection of video up-to-date. Furthermore, it would be expensive to store the video data depicting all possible maneuvers that a driver could possibly make in a geographic area.

Accordingly, there is a need to provide additional features on navigation systems and other computing systems to help guide a user. Further, there is a need to provide ways to help a user know his/her position or orientation relative to his/her surroundings in a maneuver. There is a further need to provide information to a user to help locate or orient a user in his/her surroundings in a maneuver in a manner that efficiently uses computing resources.

SUMMARY OF THE INVENTION

To address these and other objectives, the present invention includes a system and method for displaying video on a computing device for navigation and other purposes. A map database developer collects video data. The video data is collected by traveling along roads in a geographic area and storing the video data along with data indicating the positions at which the video data had been captured. This captured video data is then used in navigation systems and other devices that provide navigation, routing, games, or other features. An application forms a video that shows a turn at an intersection from a first road onto a second road. The application adds video that depicts travel away from the intersection along the second road to video that depicts travel into the intersection along the first road to form a new video that shows the turn at the intersection from the first road onto the second road. The new video is then presented to a user on a display.

According to a further aspect, an orientation of the direction of view of at least one of the videos is shifted into the turn.

According to further aspects, video effects, such as a wipe or a fade, may be used when presenting a transition from the video that depicts travel into the intersection along the first road and the video that depicts travel away from the intersection along the second road.

DETAILED DESCRIPTION OF THE PRESENTLY PREFERRED EMBODIMENTS

I. Collection of Video Data

Figure 1:
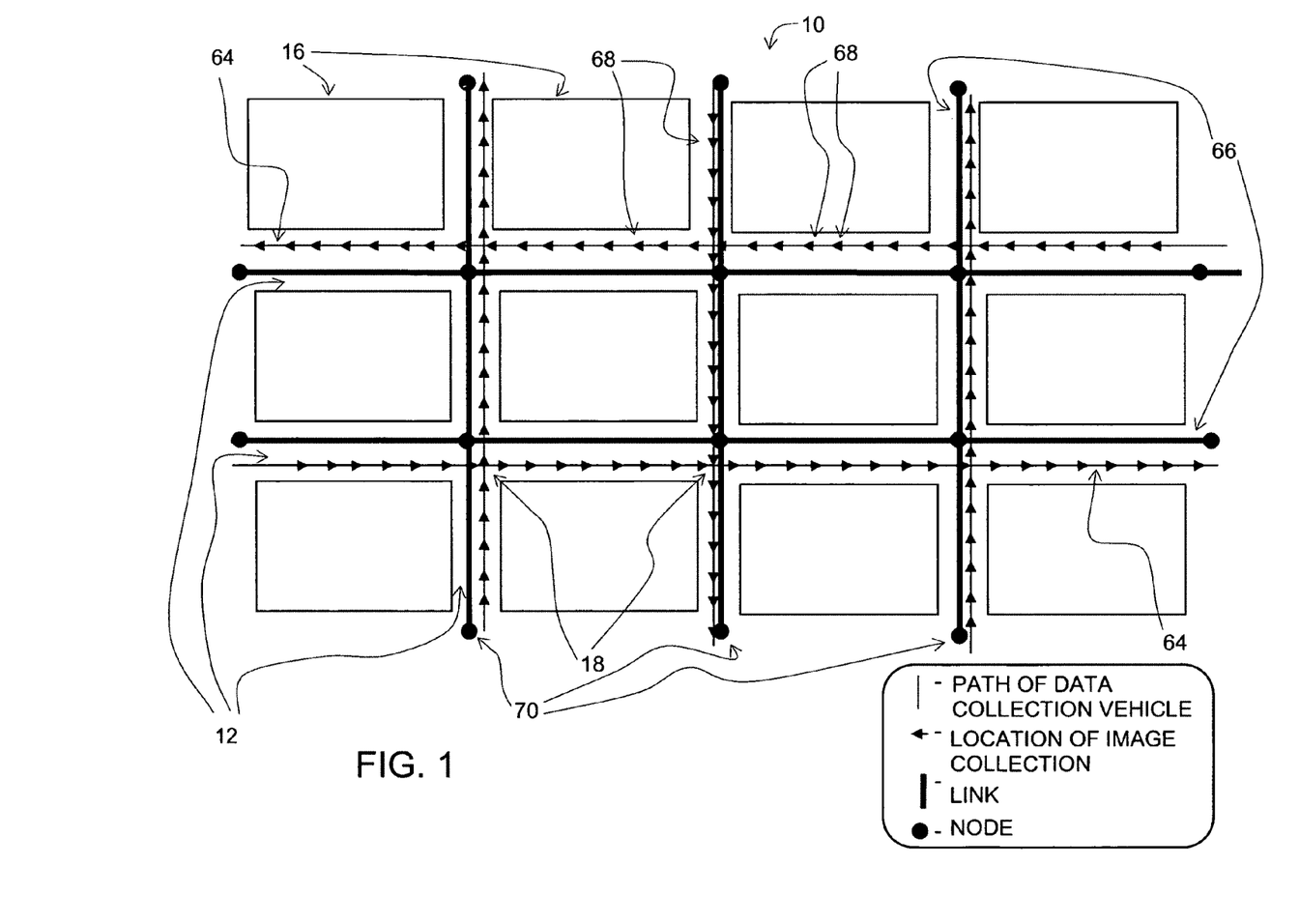
FIG. 1 is an overhead illustration of a portion of a geographic area.

FIG. 1 is an overhead illustration of a portion 10 of a geographic area. A map developer collects data for a database that represents geographic features located in the geographic area. FIG. 1 shows roads 12 located in the geographic area. In this illustration, the roads 12 divide the area into blocks 16. Intersections 18 are formed where two (or more) roads 12 meet. FIG. 1 shows only several streets, blocks, and intersections. It is understood that the geographic area may include hundreds or thousands of streets, blocks and intersections. For example, the geographic area may include a metropolitan area, a state, county, country, or several countries. Also, it is understood that not all roads, blocks, and intersections in the geographic area are as regular as shown in FIG. 1. For example, roads may be wider or narrower (e.g., more or fewer lanes), roads may meet at various angles, blocks may be larger or smaller and more irregular in shape, and likewise intersections may be larger or smaller or irregular.

Figure 2:
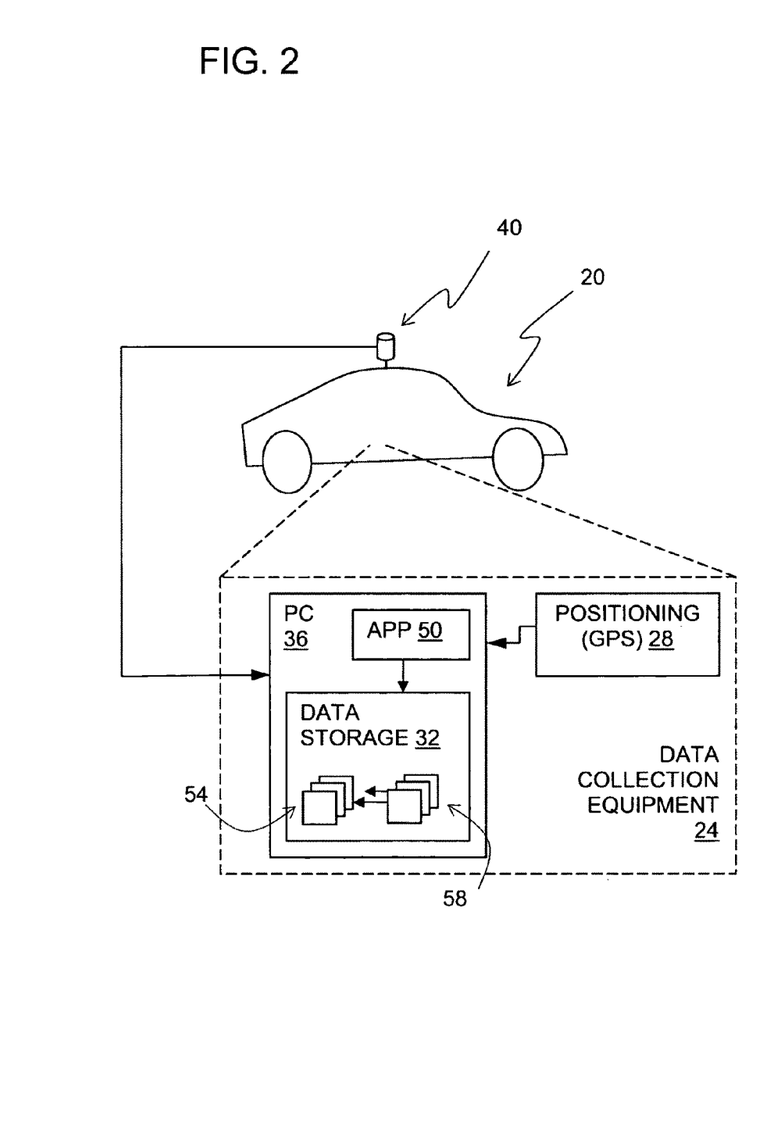
FIG. 2 is an illustration of a vehicle in which is installed data collection equipment used to collect data in the geographic area, a portion of which is shown in FIG. 1.

The map developer uses vehicles that are driven along the roads 12 to collect data about the geographic area. FIG. 2 shows one of the vehicles 20 used by the map developer to collect data. Installed in the vehicle 20 is data collection equipment 24. The data collection equipment 24 includes a combination of hardware and software. The data collection equipment 24 includes a positioning unit 28. The positioning unit 28 may be a GPS unit, or alternatively the positioning unit 28 may include an inertial sensor, or other equipment, that enables the position of the vehicle 20 to be determined. The position may be determined as geographic coordinates (latitude, longitude, and altitude), street addresses or any other way. The data collection equipment 24 also includes a data storage unit 32. In one embodiment, a hard disk drive of a portable personal computer 36 is used as the data storage unit 32. Alternatively, a separate data storage unit, such as an external hard disk drive, may be provided.

The data collection equipment 24 also includes a video camera 40. The video camera 40 is mounted on the vehicle 20 (e.g., on the roof) so that images can be taken in all directions (360° horizontally around the vehicle and up) from a vantage point that is approximately 2 meters above the ground. Thus, the video camera is mounted to obtain street-level video. The video is street level (or near street level) because it is captured using data collection equipment located in a vehicle being driven along the road. The street level video closely matches what a person traveling along the street would observe (i.e., in all directions).

Figure 3:
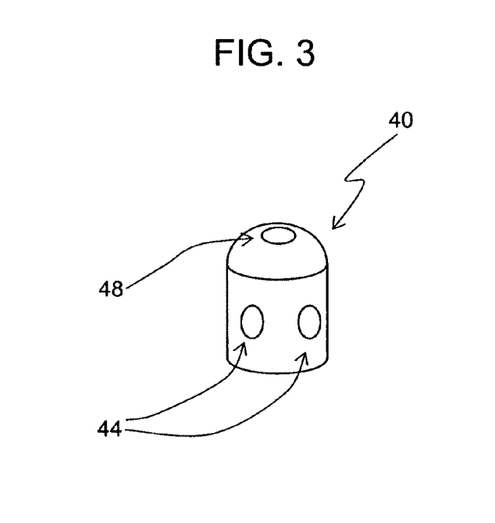
FIG. 3 is a perspective view of the camera shown in FIG. 2.

In one embodiment shown in FIG. 3, the video camera 40 includes six lenses. In one embodiment, the video camera is a Ladybug®2 spherical digital video camera, manufactured by Point Grey Research of Vancouver, BC, Canada, although other cameras may be used. As shown in FIG. 3, five of the lenses 44 on the camera 40 are oriented horizontally and one lens 48 is oriented upward. In other embodiments, cameras with more or fewer lenses may be used.

The data collection equipment 24 also includes a data collection application 50. The data collection application 50 is a software program that is executed on the personal computer 36. The video camera 40 and the positioning unit 28 are operatively connected to the personal computer 36. The data collection application 50 operates the video camera 40, the positioning unit 28 and the personal computer 36 to collect video data and position data on the data storage unit 32. More specifically, as the vehicle 20 is being driven along the roads (12 in FIG. 1), the data collection application 50 causes the video camera 40 to capture frames of video data as the vehicle is being driven along the roads 12 and to store the frames as data 54 on the data storage unit 32. Further, the data collection application 50 causes position information acquired from the positioning unit 28 to be stored as data 58 on the data storage unit 32. The data 58 acquired from the positioning unit 28 indicates the position (latitude, longitude, altitude) where the frames were captured. Thus, the data collection application 50 stores the frames and data that indicates the positions of the frames.

The data collection application 50 can be used to specify the frame capture (and storage) rate of the video camera 40. A suitable frame capture rate may be selected. The frame capture rate may be time-based or distance-based. For example, a frame rate of 3 frames per second may be chosen. Alternatively, the data collection application 50 may be used to specify a frame capture rate of every 10 meters. Faster and slower frame capture rates, either time-based or distance-based, may also be selected. According to another alternative, a combination of a time-based and distance-based frame capture rates may be selected. The frame capture rate may also be selected as a function of other factors, such as type of roads, weather, traffic, etc.

The rate at which the position data is acquired (and stored) may also be selected. The position data capture rate may be selected by the positioning unit 28, by the data collection application 50, or by other means. For example, the position data capture rate may be selected to be once per second. Alternatively, faster or slower position data capture rates may also be selected.

The position data is associated with the video frame data so that the position at which each video frame was captured is, or can be, determined. There are various ways that the position data may be matched to the video frames. One way is to associate each video frame with the most recently acquired position. Alternatively, the position of each video frame may be associated with a position that is interpolated between positions acquired by the positioning unit 28. According to another alternative, the video frame data and position data may each be associated with a capture time, which is then used to match the video frames to positions. According to still another alternative, since the video frames represent images that are captured in sequence, if the sequence is maintained when the frames are stored, then only some of the video frames need to be directly associated with positions. Those video frames not directly associated with positions may be assumed to represent positions located between those directly associated with positions. The data collection application 50 may also account for any processing delays between the video and position data collection data streams.

Referring again to FIG. 1, paths 64 are illustrated along the streets 12. As mentioned above in connection with FIG. 1, the map developer uses vehicles that are driven along the roads 12 in a geographic area to collect data. The paths 64 represent the paths that the vehicle (20 in FIG. 2) follows as it is driven along the roads 12 to collect video and position data. In FIG. 1, the paths are shown as straight lines. These straight paths indicate that, in many cases, the vehicle 20 is driven straight through the intersections 18 (i.e., instead of turning left or right). In general, a pattern of paths 64 is selected so that the vehicle 20 is driven along each road at least once. However, in order to perform the data collection process efficiently, the pattern is chosen that reduces traveling on the same road more than once (in the same direction). Of course, at some point along a road the vehicle path curves as the vehicle 20 turns to travel onto another road.

The map developer may use vehicles 20 equipped with data collection equipment (24 in FIG. 2) to collect video and corresponding position data on all the roads in the entire geographic area. Alternatively, the map developer may collect video and corresponding position data on the roads in only portions of the entire geographic area.

Still referring to FIG. 1, arrows 68 are shown at positions along each of the paths 64. The arrows 68 indicate the direction that the vehicle 20 is traveling along the corresponding path when it is being operated to collect video and position data. The arrows 68 also indicate positions along the roads at which a frame of video data was captured.

Figure 4:
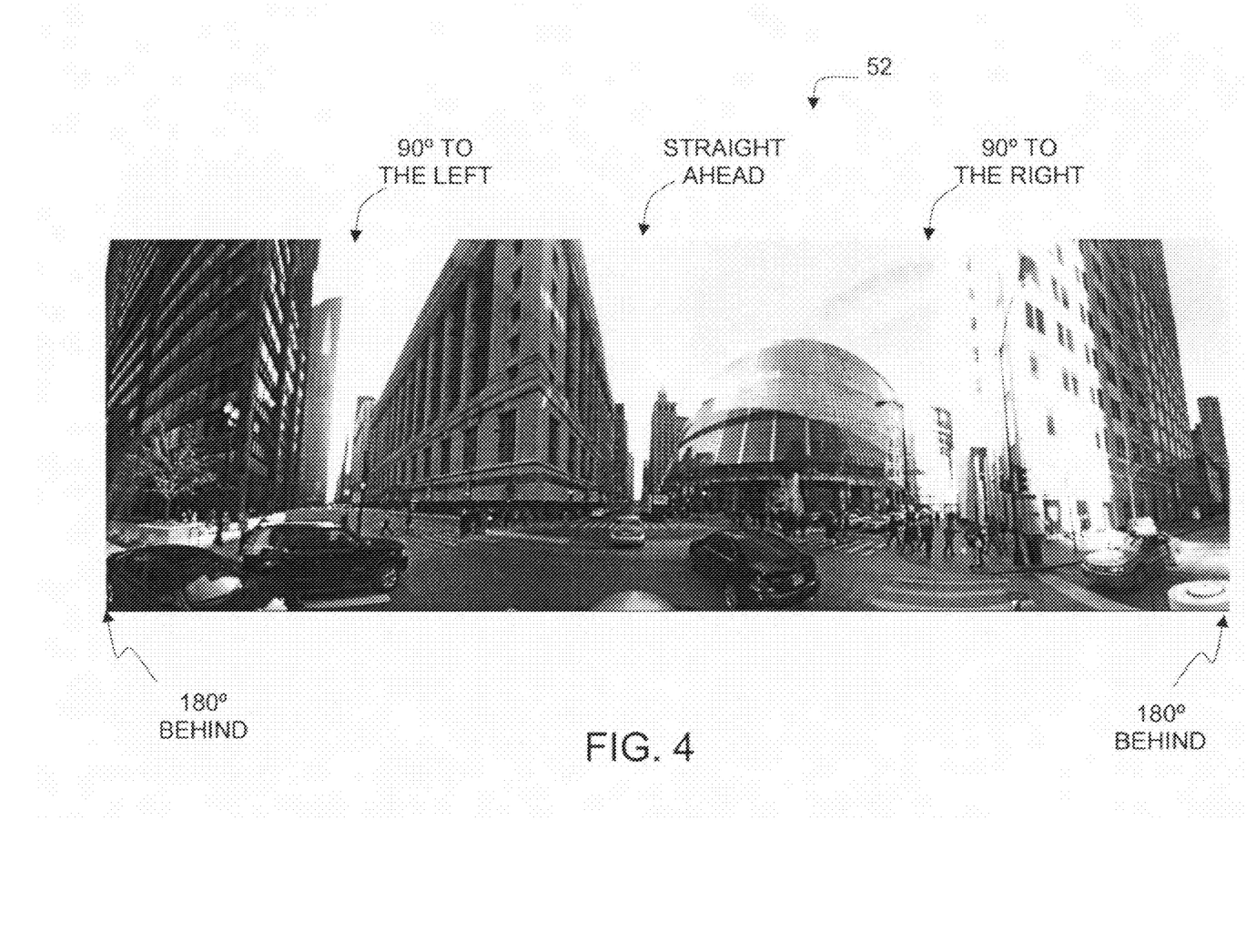
FIG. 4 shows a 360° panoramic video image frame captured by the camera of FIG. 3.

In one embodiment, the video frame captured at each position is a 360° panoramic video frame image. In other words, using a video camera that has multiple lenses mounted horizontally, and possibly a lens oriented vertically, each video frame is a 360° composite image viewed in all horizontal directions and up. FIG. 4 shows an example of a 360° panoramic video frame image 52. In this embodiment, the data collection software 50 automatically stitches together the separate images acquired by each of the multiple camera lenses to form a single, 360° panoramic video frame image. Alternatively, the other kinds of video frames may be captured at positions along each of the roads, including multiple frames that are not automatically stitched together, wide-angle images, a fish eye lens images or even plain single-direction images.

One advantage of capturing 360° panoramic video is that the video can be played back to show travel in either direction. Travel in the reverse direction can be depicted by using the rearward orientation of the panoramic view and playing the frames back in the reverse order from the order in which they were captured. (Note that other vehicles and pedestrians will also be traveling in reverse.)

FIG. 1 also shows links 66 and nodes 70. Links 66 are representations of the roads 12 in a database that represents geographic features located in the geographic area, such as the database being developed by the map developer. In such a database, each segment of a road (such as a portion of a road between intersections or where certain attributes of the road change) is represented by a separate data entity (i.e., a road segment data entity or record). A road segment data entity includes (or references) data that indicates the location of the road, as well as other attributes of the road. Nodes 70 are representations of the endpoints of links. A road segment data entity may indicate the location of the road segment it represents by the coordinates of its endpoints (i.e., its nodes). As shown in FIG. 1, the locations associated with links 66 correspond to the centerlines of the roads 12 they represent.

The map developer may collect the data used to form the road segment and node data entities at the same time the video data is collected. Alternatively, the data used to form the road segment and node data entities may be collected at a different time, either before or after. The data used to form the road segment and node data entities may be collected by a party other than the map developer.

Figure 5:
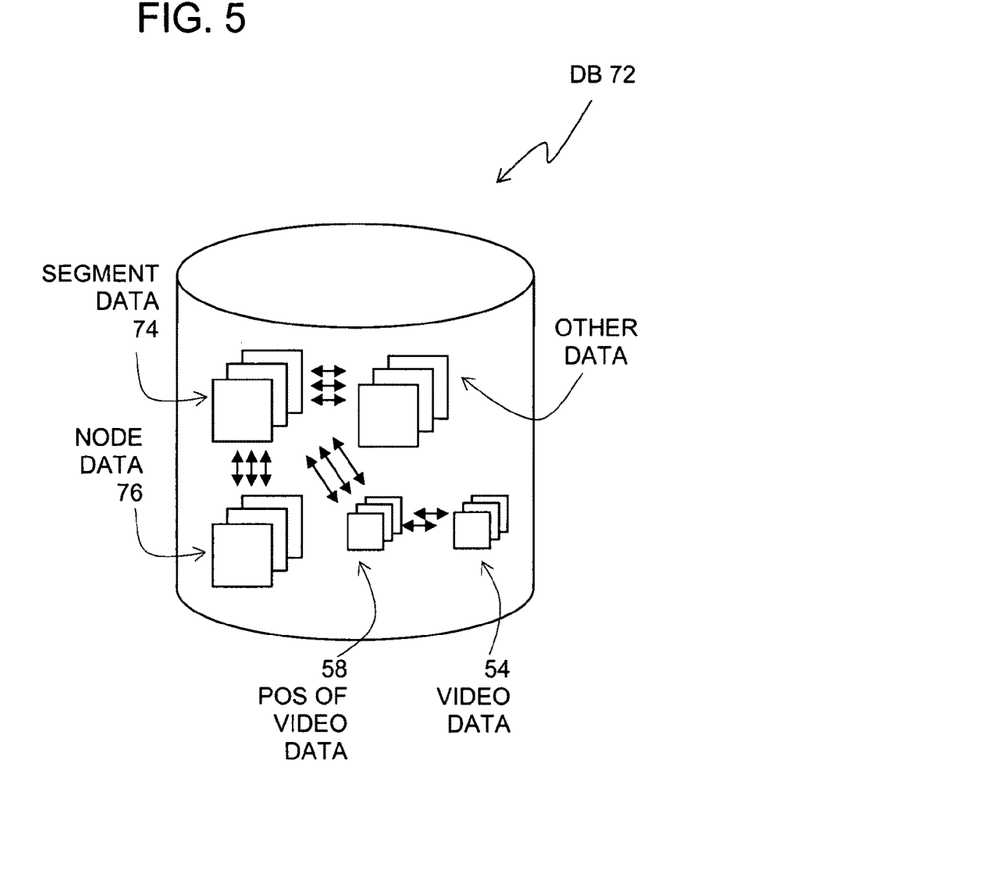
FIG. 5 is a diagram showing a database that represents geographic features and that includes the video data collected with the system in FIG. 2.

FIG. 5 shows a representation of a geographic database 72 that includes road segment data entities 74, node data entities 76, video data 54 and data 58 indicating the positions where the video data was collected.

II. Use of Video Data

Once the video data is captured, as described above, it can be used in various ways to support vehicle and/or pedestrian navigation applications, and other purposes.

Figure 6:
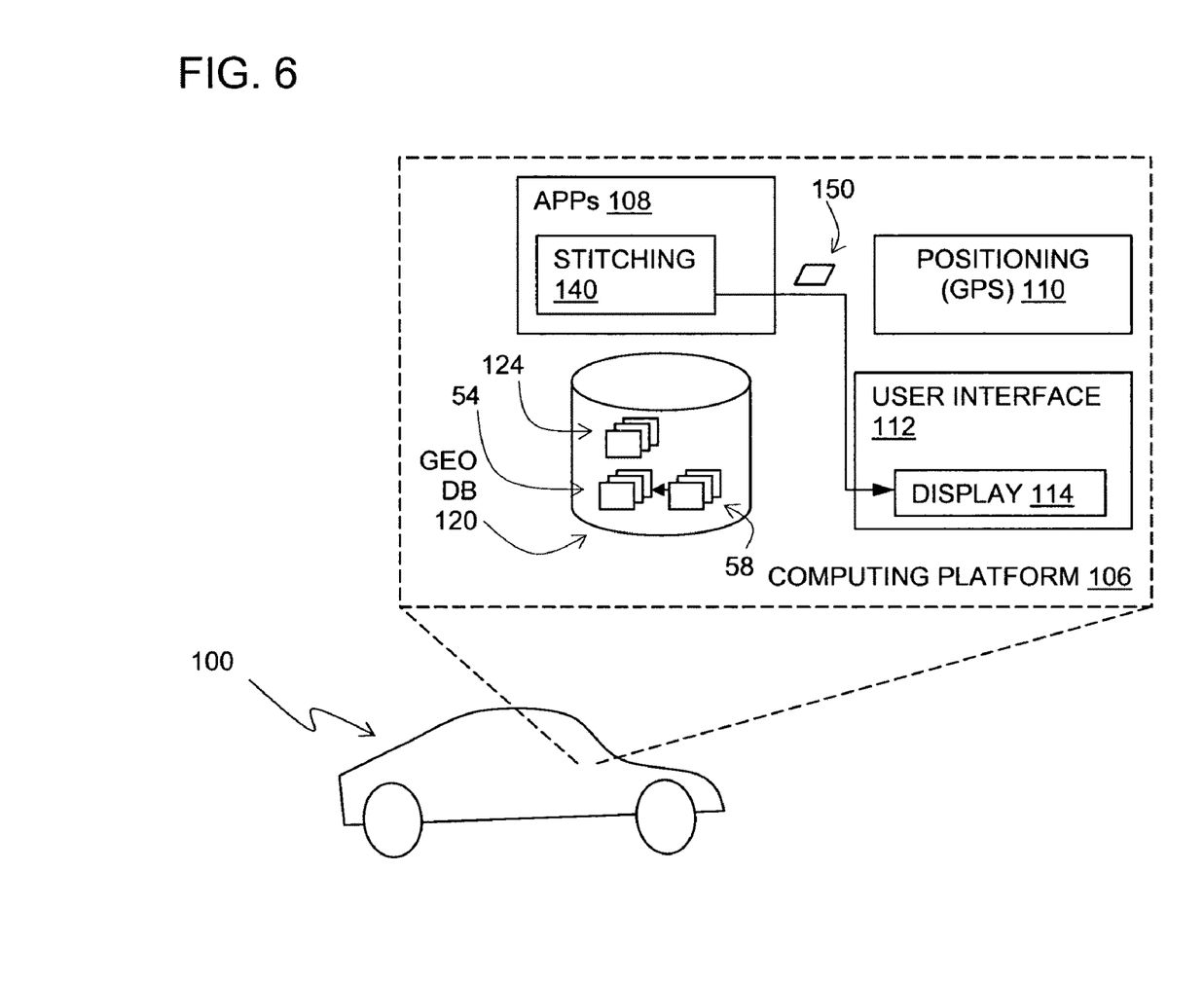
FIG. 6 illustrates an end user's computing platform that uses the video data collected with the data collection system shown in FIG. 2.

FIG. 6 shows an end user's computing platform 106. In this embodiment, the computing platform 106 is installed in a vehicle 100 (i.e., the end user's vehicle). In this embodiment, the computing platform 106 is used to provide navigation-related features to the end user (i.e., a driver or passenger of the vehicle 100).

The computing platform 106 is a combination of hardware, software and data. In one embodiment, the computing platform 106 is an in-vehicle navigation system. In an alternative embodiment, the computing platform 106 may be a personal navigation device ("PND") such as a hand-held, portable device designed specifically for navigation purposes. In another alternative, the computing platform is a general purpose computing device, such as a personal digital assistant ("PDA") or portable personal computer in which is installed a navigation-related application and to which a positioning system, such as a GPS unit, is attached. In another alternative, the computing platform may be a mobile phone that provides navigation features. The computing platform 106 may be a standalone platform in which the hardware, software and data are all stored locally, e.g., with the vehicle. Alternatively, the computing platform may be connected to a network. In a networked platform, some or all the functions may be provided by software, hardware or data located locally or remotely. In yet another embodiment, the computing platform 106 may be a desktop computer or other computing device used to obtain navigation or routing information, either from data and applications stored locally or from data and/or applications stored remotely and accessed over a network, e.g., the internet.

As stated above, the computing platform 106 is used to provide navigation-related functions. Navigation-related functions are provided by appropriate application software 108 and may include route calculation, route guidance, destination selection, electronic yellow pages, vehicle positioning, and map display. The computing platform 106 may perform additional functions or may provide only some of these functions.

The computing platform 106 includes a positioning unit 110. The positioning unit 110 may be a GPS unit, and may include inertial sensors, differential wheel speed sensors, a compass, or other equipment, that enables the position of the vehicle 100 to be determined. The positioning unit 110 operates with the navigation application software 108. The position may be determined as geographic coordinates (latitude, longitude, and altitude), street address or any other way.

The computing unit 106 also includes a user interface 112. The user interface 112 includes means that enable a user to enter information into the computing platform 106 and means by which the user can receive information from the computing platform 106. The user interface may include speakers, a microphone, a keypad, voice recognition software, etc. In this embodiment, the user interface 112 also includes a display 114.

The computing platform 106 uses a geographic database 120. The geographic database 120 includes data 124 about the geographic area in which the vehicle 100 is located. The geographic database 120 includes data collected by the map developer. In this embodiment, the geographic database 120 includes data about the roads in the geographic area, including data indicating the locations of the roads and intersections. The geographic database 120 may also include information about the names of the roads, one-way streets, number of lanes, locations of traffic signals and signs, speed limits, turn restrictions, address ranges, and so on. The geographic database 120 may also include information about points of interest, such as businesses, landmarks, museums, ATMs, government offices, and so on.

In one embodiment, the data in the geographic database 120 is in a format that is optimized for providing navigation-related functions. The geographic database 120 is formed by a compiler process that forms the database in the optimized format from a version of the database in a different format, such as a delivery format, like the Geographical Data File ("GDF") format. The version of the database in the delivery format, in turn, was formed by a compiler process that forms the delivery format from a different format that is optimized for data collection and updating, such as the format of the database shown in FIG. 4.

In FIG. 6, the geographic database 120 includes the video data 54 and position data 58 collected by the data collection equipment (24 in FIG. 1). In the compiled geographic database 120 used to provide navigation-related features, the video data 54 and position data 58 may be in a different format than the format in which it was collected.

In this embodiment, the navigation application software 108 includes a stitching feature 140. The stitching feature 140 operates with the other applications among the navigation-related software applications 108. The stitching feature 140 operates to provide a user of the computing platform 106 a video 150 on the display 114 showing a turn from one road onto another at an intersection from a street-level vantage point using the video data 54 stored or associated with the database 120. The video of the turn at the intersection is displayed even though the original video data did not show a turn, but instead showed travel straight through the intersection.

The video of a turn at an intersection from a first road onto a second road is created using two separate videos, i.e., the video taken while traveling along the first road straight through the intersection and the video taken while traveling along the second road straight through the intersection. In a preferred embodiment, these videos are 360° videos. The stitching application 140 stitches frames selected from the video of travel along the first road to frames selected from the video of travel along the second road to create a new video that shows a turn through the intersection from the first road onto the second road. The new video depicts a turn (i.e., travel along a path) that did not exist in either of the original videos.

Figure 7A:
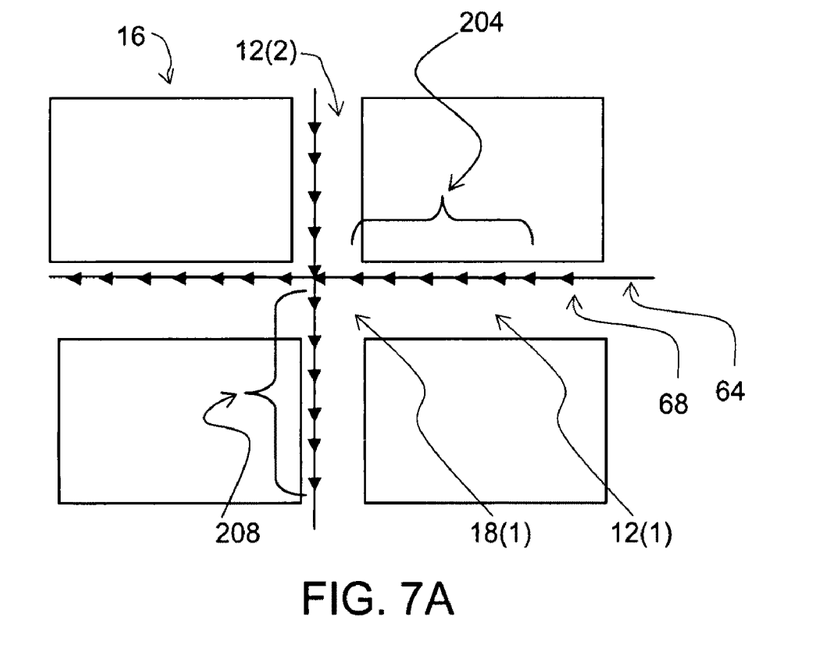
FIG. 7A is a diagram showing how two videos are stitched together to form a new video showing the turn.
Figure 7B:
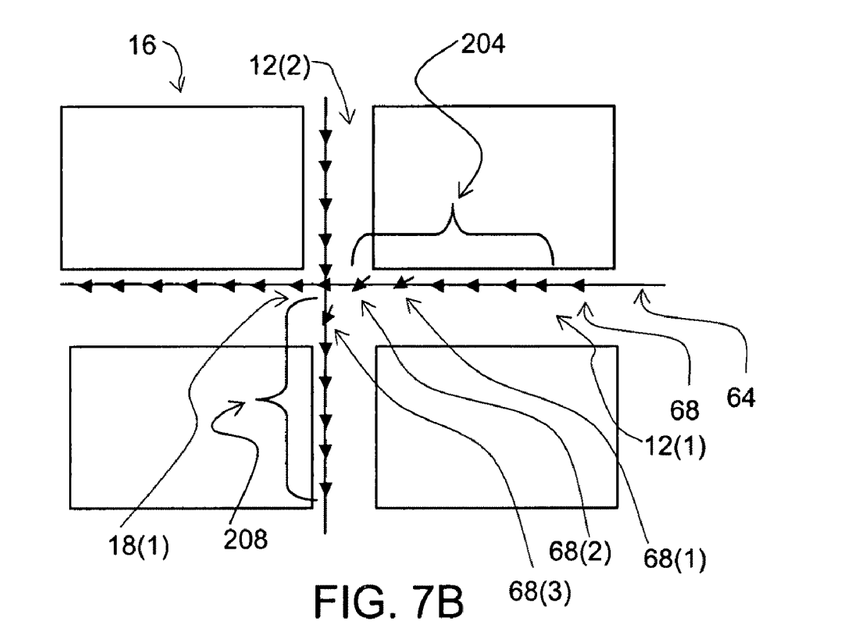
FIG. 7B is a diagram similar to FIG. 7A, showing how the orientations of some of the frames of the two videos are rotated to form in the new video showing a turn.
Figure 8A:
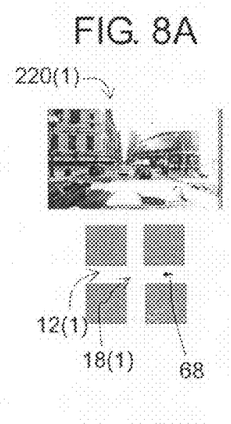
FIGS. 8A-8E show a series of video frames corresponding to positions along a first road.
Figure 8B:
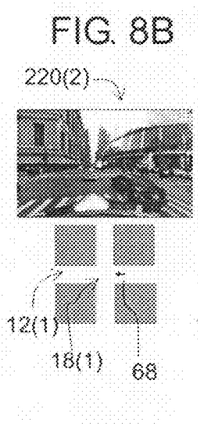
Figure 8C:
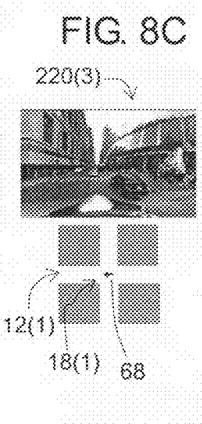
Figure 8D:
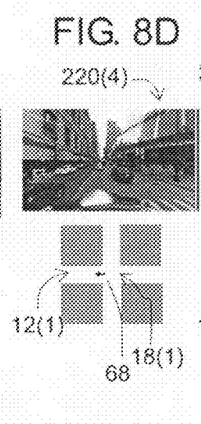
Figure 8E:
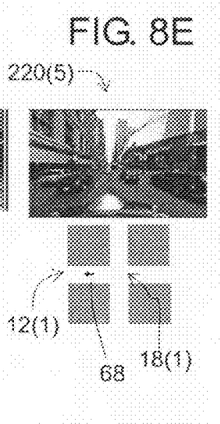
Figure 9A:
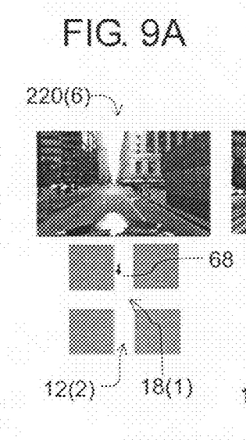
FIGS. 9A-9E show a series of video frames corresponding to positions along a second road that intersects the first road shown in FIGS. 8A-8E.
Figures 9B, 9C:
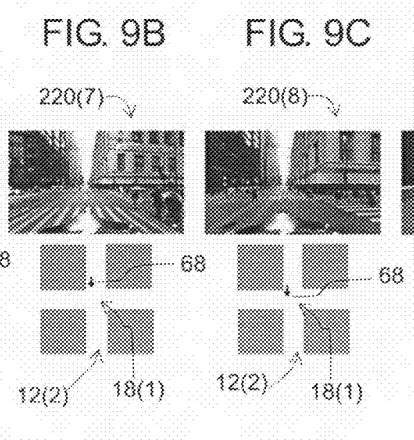
Figures 9D, 9E:
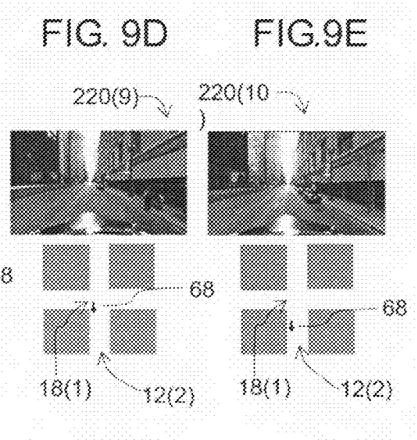
Figure 10A:
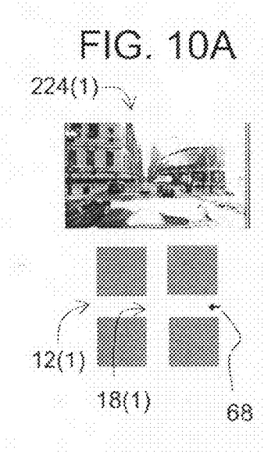
FIGS. 10A-10G show a series of video frames that form a video showing a turn from the first road shown in FIGS. 8A-8E onto the second road shown in FIGS. 9A-9E.
Figure 10B:
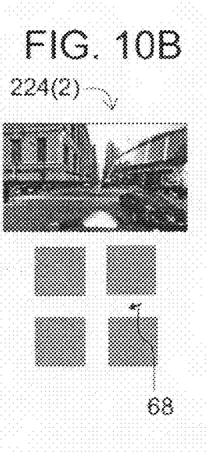
Figure 10C:
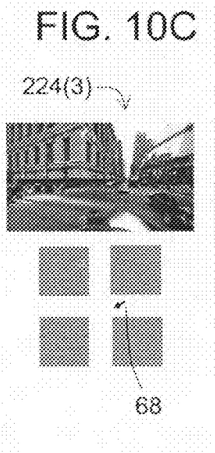
Figures 10D, 10E:
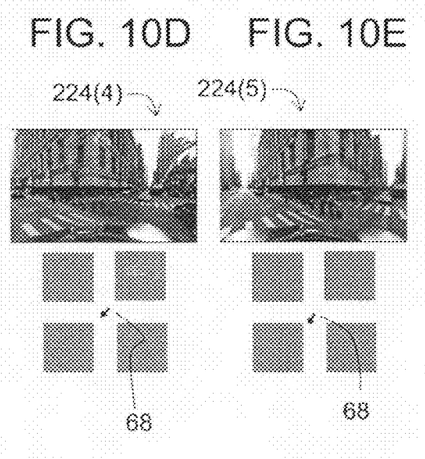
Figure 10F:
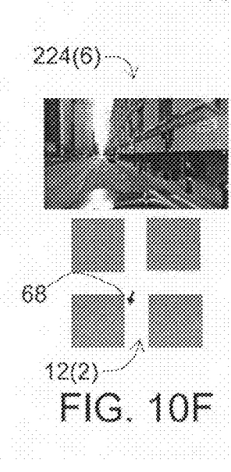
Figure 10G:
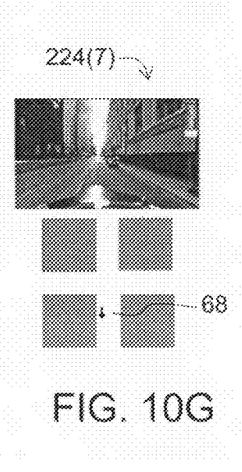

FIGS. 7A and 7B are diagrams illustrating how the stitching feature (140 in FIG. 6) selects frames from the two videos depicting passage straight through an intersection in order to create a new video that shows a turn from one road onto another at the intersection. FIGS. 7A and 7B show an intersection 18(1), which is one of the intersections 18 shown in FIG. 1. FIGS. 7A and 7B also show two roads 12(1) and 12(2), which are some of the roads 12 shown in FIG. 1. FIGS. 7A and 7B also show some blocks 16, paths 64 and video frame acquisition points 68 shown in FIG. 1.

According to the process, the stitching feature 140 identifies and selects a number (e.g., 1-5) of the video frames in the video data 54 corresponding to positions 68 along the first road 12(1), i.e., the road leading into the turn at the intersection 18(1). These video frames are indicated in FIGS. 7A and 7B at 204. The stitching feature 140 also identifies and selects a number (e.g., 1-5) of the video frames in the video data 54 corresponding to positions 68 along the second road 12(2), i.e., the road leading away from the turn at the intersection 18(1). These video frames are indicated in FIGS. 7A and 7B at 208. The stitching feature 140 uses these video frames, corresponding to the positions indicated at 204 and 208, to form a new video of a turn from the one road 12(1) onto the other 12(2). The stitching feature 140 combines the video frames corresponding to the positions indicated at 204 showing travel leading into the intersection 18(1) along the first road 12(1) with the video frames corresponding to the positions indicated at 208 showing travel leading away from the intersection 18(1) along the second road 12(2).

FIGS. 8A-8E show video frames 220(1)-220(5) and their corresponding positions 68 along the first road segment 12(1), i.e., the road segment leading into the intersection 18(1) where the turn from the first road segment 12(1) onto the second road segment 12(2) will be depicted by the video created by the stitching feature 140. The video frames 220(1)-220(5) shown in FIGS. 8A-8E correspond to positions 68 leading straight through the intersection 18(1). These video frames 220(1)-220(5) include frames that will be used to create the new video of the turn, as well as frames that will not be used to create the new video of the turn. (Note that although the video is 360° panoramic video, the video frames 220(1)-220(5) shown in FIGS. 8A-8E include only that portion of the video frame oriented in the forward direction, i.e., right to left in the associated diagrams. (Although not shown in FIGS. 8A-8E, the stitching feature simulates the turn for the full 360° view, not just the forward view. A user could pan in any direction while the turn is being presented and the stitched together video would simulate the view in that direction, e.g., if the user wanted to look at a particular building while viewing the turn.)

FIGS. 9A-9E show video frames 220(6)-220(10) and their corresponding positions 68 along the second road segment 12(2), i.e., the road segment leading away from the intersection 18(1) where the turn from the first road segment 12(1) onto the second road segment 12(2) will be depicted by the video created by the stitching feature 140. The video frames 220(6)-220(10) shown in FIGS. 9A-9E correspond to positions leading straight through the intersection 18(1). These video frames 220(6)-220(10) include frames that will be used to create the new video of the turn, as well as frames that will not be used to create the new video of the turn. (Note that although the video frames 220(6)-220(10) shown in FIGS. 9A-9E are 360° panoramic video, the video frames show only that portion of the video frame oriented in the forward direction, up-to-down in the associated diagrams.)

In order to create the visual effect of turning, the orientation of the last one or more of the selected frames, corresponding to positions at 204, depicting travel along the first road 12(1) and/or the first one or more of the selected frames, corresponding to positions at 208, depicting travel along the second road 12(2) are rotated into the turn. The number of frames selected depends on the how sharp a turn to depict and how close the positions of the frames are to the intersection. As mentioned above, in a preferred embodiment, the video is a 360° panoramic video. With 360° panoramic video, the entire video frame contains the entire 360° view around the position at which it was captured. The orientation of the frame can be rotated by shifting positions horizontally across the frame. For example, to depict a turn to the left, the orientation of the video frame is rotated to the left by shifting the center of view of the frame towards the left. Referring to FIG. 7B, note that the direction of the arrows 68(1), 68(2) and 68(3) are rotated. Rotating these images causes the direction that appears to be forward in the video frame to shift, i.e., in the direction indicated by the arrows. The amount of rotation applied to each video frame can be determined as a function of its distance from the intersection and how sharp a turn to depict.

FIGS. 10A-10G show video frames 224(6)-224(7) and their corresponding positions 68 along the first road segment 12(1) and the second road segment 12(2). The video frames 224(6)-224(7) shown in FIGS. 10A-10G correspond to positions leading up to the intersection 18(1) along the first road segment 12(1) and away from the intersection 18(1) along the second road segment 12(2). Note that the video frames 224(6)-224(7) shown in FIGS. 10A-10G are rotated (as shown in FIG. 7B) to show that portion of the video frame oriented in the forward direction, i.e., traveling through the turn. In one embodiment, the orientations of both the videos are rotated so that the objects in the images match. For example, ⅓ of the way through a 90° right turn, the video captured along the first road is rotated −30° and video captured along the second street is rotated +60° such that objects in each video will appear at the same location when the composite video is viewed.

In addition to selecting the appropriate frames and rotating the orientation of the frames, the stitching application 140 may include other processes and/or effects when forming the video of the turn in order to enhance the appearance of the video.

One process that the stitching application 140 may perform is a video wipe step. The video wipe step causes the transition from one video frame to the next to occur by replacing the first video frame with the second mage along a gradual spatial boundary that appears to move across the image. In one embodiment, the video wipe is oriented in the direction of the view of the second video. The video wipe step may be applied to transitions between video frames that form the turn, and may also be used for transitions between video frames along straight paths.

Figure 11A:
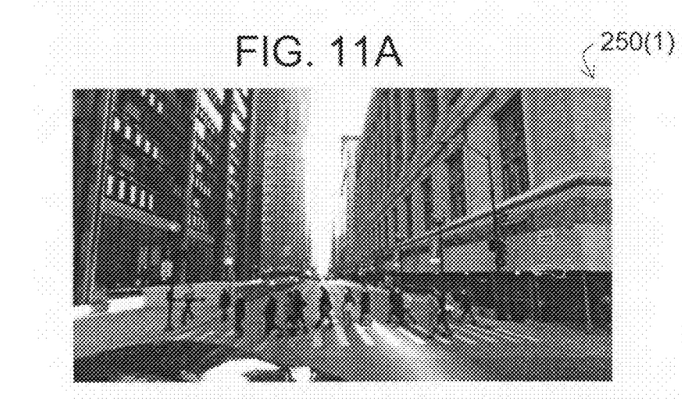
FIGS. 11A-11D show a wipe step applied to a series of image frames that form a transition between videos.
Figure 11B:
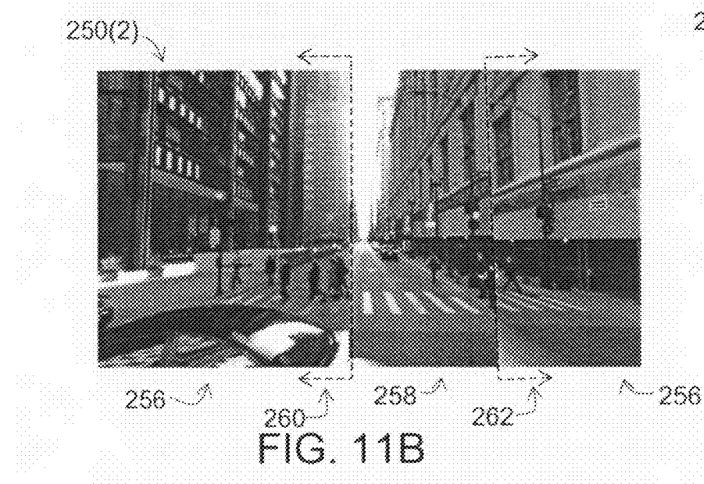
Figure 11C:
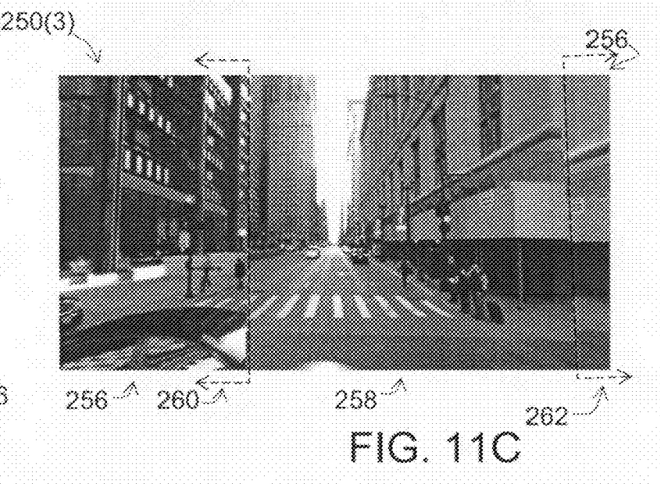
Figure 11D:
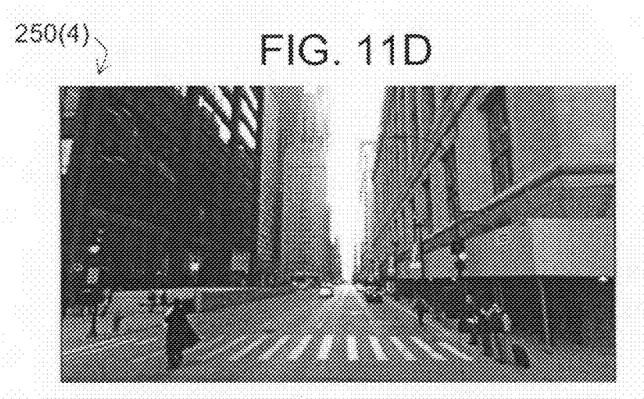

A video wipe is illustrated in FIGS. 11A-11D. FIGS. 11A-11D show video frames 250(1)-250(4). Frame 250(1) in FIG. 11A shows the initial stage for the video wipe transition and frame 250(4) in FIG. 11D shows the final stage for the video wipe transition. Frame 250(2) in FIG. 11B and frame 250(3) in FIG. 11C show intermediate stages in the video wipe transition. The image in frame 250(1) in FIG. 11A is a view looking 90° to the left down a cross street as the vehicle in which the camera was installed traveled along a road. (Note that there are pedestrians are in the crosswalk in FIG. 11A.) The image in frame 250(4) in FIG. 11D is a view from the vehicle looking straight ahead as the vehicle was being driven straight down the cross street shown in FIG. 11A. (The image in FIG. 11D was captured during a different pass through the intersection. Note that there are no pedestrians in the crosswalk in FIG. 11D.) Frame 250(2) in FIG. 11B and frame 250(3) in FIG. 11C are composites of frame 250(1) in FIG. 11A and frame 250(4) in FIG. 11D, showing the video wipe step. Frame 250(2) is composed of part of frame 250(1) in the sections marked 256 and part of frame 250(4) in the section marked 258. Note that sections 256 and 258 are separated by boundaries 260 and 262. (The dashed lines corresponding to the boundaries 260 and 262 are included for purposes of describing the effect and would not be present in an actual video wipe.) The boundaries 260 and 262 start coincident to each other and gradually move horizontally to the horizontal edges of the frame so that frame 250(1) is gradually replaced by frame 250(4) along the moving boundaries 260 and 262. The amount of time over which the video wipe transition occurs is adjustable, such as several seconds or less.

The video wipe step may be performed by the stitching application or alternatively, the video wipe step may be performed separately, such as by a process that displays the video formed by the stitching application.

Another process that the stitching application may perform is a fade step. The fade step causes the transition from one video frame to the next to occur gradually, i.e., so that the second image appears translucently over the first image so that both images are discernable at the same time. The second image gradually become less translucent and eventually completely replaces the first image. The fade step may be applied to transitions between video frames that form the turn, but may also be used for transitions between video frames along straight paths.

Figure 12A:
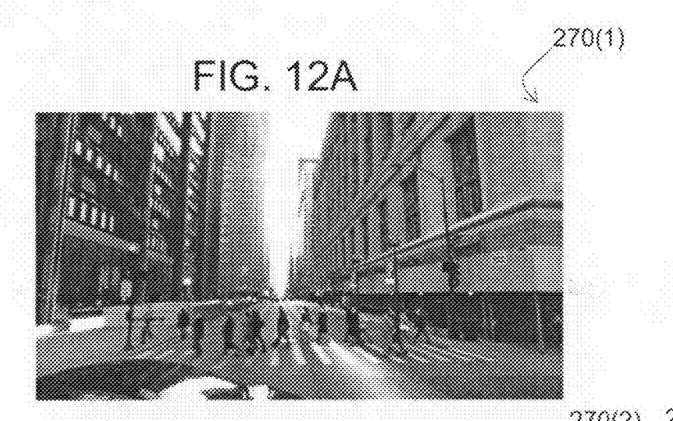
FIGS. 12A-12D show a fade step applied to a series of image frames that form a transition between videos.
Figure 12B:
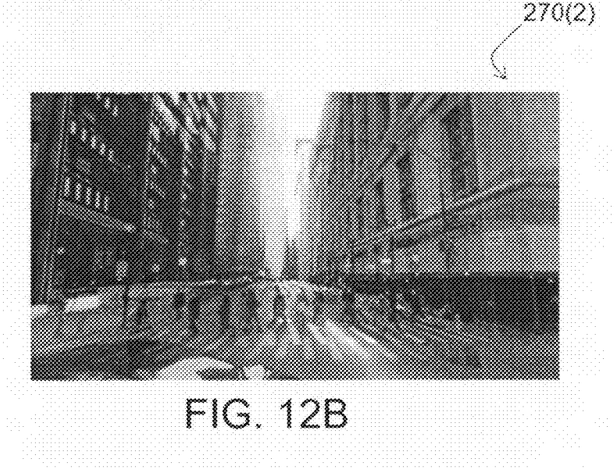
Figure 12C:
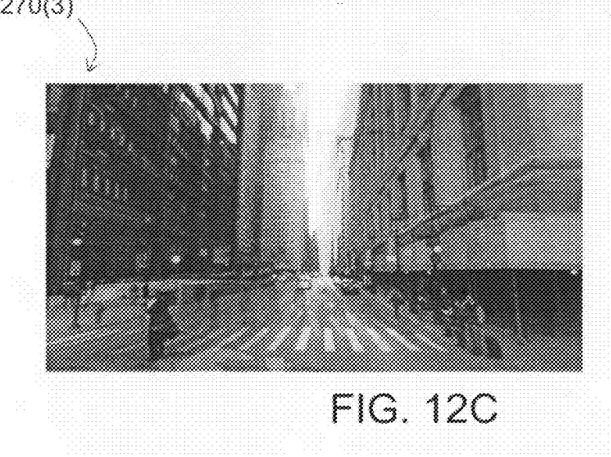
Figure 12D:
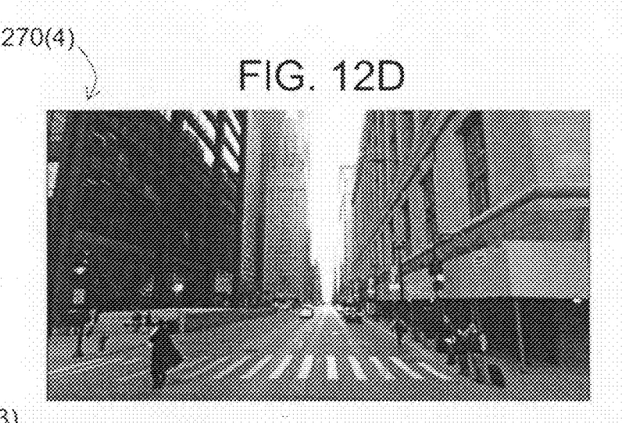

A video fade is illustrated in FIGS. 12A-12D. FIGS. 12A-12D show video frames 270(1)-270(4). Frame 270(1) in FIG. 12A shows the initial stage for the video fade transition and frame 270(4) in FIG. 12D shows the final stage for the video fade transition. Frame 270(2) in FIG. 12B and frame 270(3) in FIG. 12C show intermediate stages in the video fade transition. The image in frame 270(1) in FIG. 12A is a view looking 90° to the left down a cross street as the vehicle in which the camera was installed traveled along a road. (Note that there are pedestrians are in the crosswalk in FIG. 12A.) The image in frame 270(4) in FIG. 12D is a view from the vehicle looking straight ahead as the vehicle was being driven straight down the cross street shown in FIG. 12A. (The image in FIG. 12D was captured during a different pass through the intersection. Note that there are no pedestrians in the crosswalk in FIG. 12D.) Frame 270(2) in FIG. 12B and frame 270(3) in FIG. 12C are blends of frame 270(1) in FIG. 12A and frame 270(4) in FIG. 12D, showing the video fade step. Frame 270(2) is composed of frame 270(1) with frame 270(4) translucently blended over it. Gradually, frame 270(4) becomes less translucent (as shown in FIG. 12C) so that frame 270(1) is gradually replaced by frame 270(4), as shown in FIG. 12D. The amount of time over which the video fade transition occurs is adjustable, such as several seconds or less. In one embodiment, the video fade and vide wipe are applied at the same time to the same transition.

As mentioned above, the stitching feature 140 operates with the other applications among the navigation-related software applications 108 to provide a user with a video showing a maneuver, such as a turn, at an intersection. The stitching feature may be used with other applications in various ways. According to one embodiment, an end user selects a maneuver that he/she wants to see depicted. The end user may select the maneuver by identifying one road segment leading into an intersection as the entry segment and another road segment leading away from the intersection as the exit segment. These road segments may be identified in various ways, such as by presenting a graphical map to the user and allowing the user to select road segments depicted on the map. If the stored video does not already depict the maneuver, a video depicting the maneuver is created using the stitching feature. The stitching feature selects the video data corresponding to positions along the entry segment leading up the location of the maneuver and the video data corresponding to positions along the exit segment leading away from the location of the maneuver. These two portions of video data are added together to form a video depicting the maneuver. (Note that the video maybe rotated, wiped, and/or faded, as described above.)

The stitched together video can provide a user with useful information. By presenting a user with a video of the maneuver, the user can readily grasp what the maneuver will look like when he/she actually arrives at it. The stitched together video provides meaningful information, such as buildings, storefronts, addresses, street signs, lane configurations, landmarks, cross streets, and so on, located along the maneuver.

According to another example, the stitching feature may be used for route guidance. For example, after a route calculation application has calculated a route for a user, videos of selected maneuvers along the route may be shown to the user, e.g., on the display of the computing platform. If the stored video does not already show the maneuver, the road segments that make up the maneuver are identified and the stitching feature 140 used to create a new video using the video data that had been captured along those road segments. The maneuvers depicted this way may be selected automatically, based on various criteria, such as complexity of the maneuver, or alternatively, the maneuvers to be depicted may be selected by the user. A video showing a maneuver through an intersection may be presented to the user before the user embarks on the route, or when the user is approaching the maneuver.

III. Other Embodiment

A. Pedestrian and Other Types of Navigation

In the above embodiments, it was described how video collected by a video camera mounted on a vehicle could later be used on a computer platform in an end user's vehicle to provide meaningful information to the end user, such as a video depicting a turn. In an alternative embodiment, video may also be used to assist pedestrians. According to this alternative, a pedestrian carries a portable computing platform that has a display on which video can be shown. The portable computing platform may be a mobile phone, a personal digital assistant with navigation application software or a personal navigation system. The portable computing device carried by the pedestrian may use previously obtained video data in the same or similar way, as described above for vehicles. Routes may be indicated to pedestrians in a similar way that routing maneuvers are indicated to motorists. The video data collected along straight paths may be stitched together to show a turn that a pedestrian should take from one path to another.

Pedestrian navigation may be supported using the same street level video obtained by driving a vehicle with data collection equipment along roads in a geographic area, as described above. Pedestrian navigation may also be supported by collecting additional street level video captured with a video camera, and possibly data collection equipment, carried by a person on foot. The video camera and data collection equipment may be the same as or similar to, the video camera and data collection equipment used in a vehicle for collection of street level video and position data, as described above. A person on foot carrying a video camera and data collection equipment may collect video data along sidewalks, pedestrian-only walkways, paths, inside buildings, on train and subway platforms, and so on. Such pedestrian-collected video may be useful for providing guidance to pedestrians.

In addition to pedestrian travel, alternative embodiments may be used for travel by bicycle, motorcycle, bus, train, truck, scooter, roller skates, skateboards, segways, etc.

B. Use of Video for ADAS

Video produced by stitching together two or more videos that had been separately collected may also be used for Advanced Driver Assistance System ("ADAS") applications. These applications have been developed to improve the comfort, efficiency, and overall satisfaction of driving. Stitched together video may be used for various ADAS warning applications, such as obstacle or curve warning applications. For example, the stitched together video may show a sharp turn ahead.

C. Organization of Video Data

After the video data is captured by having one or more vehicles with data collection equipment travel along roads in a geographic area, the video data may be stored in the database (e.g., database 72 in FIG. 4) maintained by the map developer and/or in the compiled database (e.g., database 120 in FIG. 5) used by an end user in a manner that facilitates use of the video data for navigation-related functions, such as the stitching feature (140 in FIG. 5). For example, the video frames associated with a road segment may be associated with the link that represents that road segment. As an example, the road segment data entity may include one or more pointers that reference those video frames associated with positions along the represented road segment. Alternatively, other data referencing methods may be used, such as indexes, etc. According to another method, the video frames associated with each road segment may be stored separately in the database, i.e., by separating the video frames associated with each road segment and storing them with the road segment data entity that represents that road segment in the database.

D. Other

In the above embodiments, it was described how the stitching feature can be used to form a video depicting a maneuver, such as a turn from one road onto another, using stored video data that shows travel along each of the roads, but which does not show the maneuver. The stitching feature can be used to create videos of any kind of maneuver. For example, the stitching feature may be used to create a video showing merging from an entrance ramp, merging onto an exit ramp, making a U-turn, or any other kind of maneuver.

Another process that the stitching application may perform is a zoom step. The zoom step may be used to smooth the transition from one video frame to the next by zooming the first video frame until it matches the approximate vantage point of the next video frame. The zoom step may reduce any jerkiness caused by an abrupt shift in vantage points between two consecutive video frames. This effect can be used when depicting straight travel (i.e., along path that the video was originally captured) or when depicting a turn when frames from two different paths are stitched together.

According to another embodiment, the stitching feature may use video collected from travel along one path to modify video collected from travel along another path. For example, video collected while traveling on a road straight through an intersection may show pedestrians walking in the crosswalks alongside the vehicle. When using this video to depict the first part of a turn at the intersection, these pedestrians will "disappear" as the video images collected while traveling along the road are replaced with video images collected while traveling along the cross street. The absence of pedestrians in the crosswalk in the video of the cross street can be used to erase the pedestrians shown in the crosswalk in the video of the first road, using known video editing techniques.

In an above embodiment, it was described how video data is collected by traveling straight through intersections and how videos of turns can be formed by combining a portion of one video showing travel up to an intersection with a portion of another video showing travel away from the intersection. In an alternative embodiment, video data can be collected that shows turns at intersections (i.e., the vehicle being driven while the video data is being collected turns at some intersections). In this alternative, the video data that depicts a turn at an intersection can be used to form a new video that shows travel straight through the intersection, even thought the original video did not show the straight through travel. The new video showing travel straight through an intersection can be formed in a manner similar to the way video showing turns is formed, as described above.

It was disclosed above that video data could be collected by a map developer that used vehicles equipped with data collection equipment to travel on roads in a geographic area to collect the video data. Video data could be collected in other ways. For example, video data could be collected using probe vehicles. Probe vehicles are vehicles operated by parties other than the map developer, but that are equipped to collect data while they are being used for purposes other than data collection. For example, vehicles used by private persons for day-to-day commuting could be used as probe vehicles. Alternatively, service vehicles, such as police, postal, taxi, delivery, public transportation, etc., could be used as probe vehicles. Data recorded by probe vehicles is sent to a map developer where it can be processed and used.

The stitching feature may be used for applications other than navigation-related applications. For example, the stitching feature may be used for computer games, simulations, educational programs, and so on.

It is intended that the foregoing detailed description be regarded as illustrative rather than limiting and that it is understood that the following claims including all equivalents are intended to define the scope of the invention.

We claim:

1. A method for forming a video that shows a turn at an intersection from a first road onto a second road, the method comprising the steps of:

selecting video that depicts travel into the intersection along the first road;
selecting video that depicts travel away from the intersection along the second road;
adding the video that depicts travel away from the intersection along the second road to the video that depicts travel into the intersection along the first road to form the video that shows the turn at the intersection from the first road onto the second road; and
performing a video wiping step when presenting a transition between the video that depicts travel into the intersection along the first road and the video that depicts travel away from the intersection along the second road, wherein the video wiping step includes gradually replacing, alone a moving spatial boundary, a video frame of the video that depicts travel into the intersection with a video frame of the video that depicts travel away from the intersection.

2. The method of claim 1 further comprising:
rotating an orientation of at least a portion of one said videos into the turn.

3. The method of claim 1 wherein the video that depicts travel into the intersection along the first road had been collected while traveling straight though the intersection.

4. The method of claim 3 wherein the video that depicts travel away from the intersection along the second road had been collected while traveling straight through the intersection.

5. The method of claim 1 wherein the video that depicts travel away from the intersection along the second road had been collected while traveling straight through the intersection.

6. The method of claim 1 further comprising:
displaying the video that shows the turn at the intersection from the first road onto the second road.

7. The method of claim 6 wherein the video is displayed on a computing platform.

8. The method of claim 7 wherein the computing platform is carried by a pedestrian.

9. The method of claim 1 wherein step of adding is performed by a stitching application.

10. The method of claim 1 further comprising:
performing a video fading step when presenting a transition between the video that depicts travel into the intersection along the first road and the video that depicts travel away from the intersection along the second road.

11. A method for displaying video that shows a turn at an intersection from a first road onto a second road, wherein the first road extends through the intersection in a first direction and the second road extends through the intersection in a second direction different from the first direction, the method comprising the steps of:
selecting a first set of one or more video frames that had been captured while traveling straight through the intersection along the first road;
selecting a second set of one or more video frames that had been captured while traveling straight through the intersection along the second road;
adding the second set to the first set to form the video; and
displaying the video including zooming in on a first video frame of the video until it matches a vantage point of a second video frame of the video.

12. The method of claim 11 wherein the first set of one or more video frames correspond to positions leading up to the intersection and the second set of one or more video frames correspond to positions leading away from the intersection.

13. The method of claim 11 further comprising:
rotating an orientation of one or more of said video frames.

14. The method of claim 13 wherein said rotating is in a direction of the turn.

15. The method of claim 13 wherein said rotating is applied to at least that video frame of the first set that had been captured at a position closest to the intersection.

16. The method of claim 13 wherein said rotating is applied to at least that video frame of the second set that had been captured at a position closest to the intersection.

17. A method for forming a pedestrian video that shows a turn from a first road onto a second road, wherein the first road and the second road meet at an intersection, the method comprising the steps of:
adding video that shows travel away from the intersection along the second road to video that shows travel along the first road up to the intersection to form the pedestrian video, the video that shows travel away from the intersection and the video that shows travel along the first road stored on a computer-readable storage medium,
wherein the video that shows travel along the first road was captured at a different time than the video that shows travel along the second road, and wherein the video that shows travel along the first road and the video that shows travel along the second road were captured by a pedestrian.

18. A method for forming a video that shows a turn from a first road onto a second road, wherein the first road and the second road meet at an intersection, the method comprising the steps of:
adding video that shows travel away from the intersection along the second road to video that shows travel along the first road up to the intersection to form the video that shows the turn; and
performing a video fading step when presenting a transition between the video that shows travel along the first road up to the intersection and the video that shows travel away from the intersection along the second road, the video fading step including gradually making a video frame of the video that shows travel away from the intersection become less translucent over a video frame of the video that shows travel along the first road up to the intersection,
wherein the video that shows travel along the first road was captured while traveling straight through the intersection and the video that shows travel along the second road was captured while traveling straight through the intersection.

19. A method of collecting and modifying video data that shows travel along roads, the method comprising:
capturing a first video while traveling along a first road straight through an intersection;
capturing a second video while traveling away from the intersection along a second road;
determining positions at which the first video and the second video were captured; and
storing the first video and the second video along with respective data indicating the positions at which the first video and the second video were captured on a computer-readable storage medium,
wherein the first video is 360° panoramic video and the second video is 360° panoramic video, and wherein an image in the first video is modified using the second video.

20. The method of claim 19 wherein the video is associated with data entities that represent the roads.

21. A system for displaying video that depicts maneuvers at intersections comprising:
- a database containing data that represents roads;
- video data that depicts travel along the roads straight through intersections along the roads;
- a stitching application that adds a portion of the video data that depicts travel leading away from an intersection to another portion of the video data that depicts travel up to an intersection to depict a turn at the intersection, wherein the stitching application removes an image object in the portion of the video data that depicts travel leading away from the intersection using the portion of the video data that depicts travel up to the intersection.

22. The system of claim 21 wherein the video data had been previously obtained from a video camera mounted to a data collection vehicle being driven along roads.

* * * * *